(12) United States Patent
Arakawa

(10) Patent No.: US 6,510,934 B2
(45) Date of Patent: Jan. 28, 2003

(54) PARKING LOCK DEVICE FOR A SADDLE RIDING TYPE VEHICLE

(75) Inventor: Hidetoshi Arakawa, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 14 days.

(21) Appl. No.: 09/832,549

(22) Filed: Apr. 11, 2001

(65) Prior Publication Data

US 2001/0042669 A1 Nov. 22, 2001

(30) Foreign Application Priority Data

May 18, 2000 (JP) ........................................ 2000-146881

(51) Int. Cl.[7] ................................................ B60T 1/06
(52) U.S. Cl. .................... 192/219.5; 188/31; 74/577 S
(58) Field of Search ........................... 192/219.5, 219.4; 188/31, 69; 74/518, 577 S

(56) References Cited

U.S. PATENT DOCUMENTS

| | | | | | |
|---|---|---|---|---|---|
| 4,223,768 A | * | 9/1980 | Iwanaga | ..................... | 188/69 |
| 4,413,712 A | * | 11/1983 | Richard | ..................... | 188/82.7 |
| 4,671,133 A | * | 6/1987 | Yamada | ....................... | 188/31 |
| 4,719,999 A | * | 1/1988 | Ohkubo | ........................ | 188/31 |
| 4,727,967 A | * | 3/1988 | Ogasawara et al. | ........... | 188/31 |
| 5,685,406 A | * | 11/1997 | Crum et al. | .................. | 188/31 |
| 5,906,259 A | * | 5/1999 | Matsui et al. | ............ | 192/219.5 |
| 6,065,581 A | * | 5/2000 | Nogle | ......................... | 188/31 |

FOREIGN PATENT DOCUMENTS

| | | |
|---|---|---|
| JP | 10-100872 | 4/1998 |
| JP | 11-303991 | 11/1999 |

* cited by examiner

*Primary Examiner*—Saul Rodriguez
(74) *Attorney, Agent, or Firm*—Darby & Darby

(57) ABSTRACT

When the claw of the engagement piece abuts the raised portion of the lock gear, the engagement piece cannot move further and is held off at the position. When the lock gear turns a small amount then the indentation (indented portion between gear teeth on the periphery) meets the claw. At this event, the slider piece moves as it is sliding along the guide cam by the elastic force of the coil spring until the slider piece abuts the spacer. The claw of the engagement piece meshes the lock gear so that the power output shaft is fixed or will not turn whereby the wheel shafts are locked.

10 Claims, 7 Drawing Sheets

(FREE STATE)

(FREE STATE)

(ENGAGED STATE)

PARKING LOCK DEVICE FOR A SADDLE RIDING TYPE VEHICLE

BACKGROUND OF THE INVENTION (1) Field of the Invention

The present invention relates to a parking lock device for a saddle riding type vehicle, a so-called buggy, i.e., four-wheel vehicle for rough terrain which is maneuvered by a rider straddling the saddle type seat thereof by gripping its handlebars, and in particular relates to a parking lock device for locking the wheels of the vehicle so that it will not be moved when parked.

(2) Description of the Prior Art

There is a saddle riding type vehicle in which parking cams are provided in its drum brakes in the left and right rear-wheels so that by actuating the drum brakes the rear-wheels will not move when it is parked.

There is another configuration of a parking lock brake in which a lock gear is fixed on the gear shaft of the gear transmission connected to the engine while a parking actuator is provided on one side of the transmission cam drum for making a change in gear, so that the distal end of the actuator will mesh the lock gear to lock the gear shaft of the transmission to thereby lock the wheel shaft on the rear side of the gear transmission (see Japanese Patent Application Laid-Open Hei 11 No.3039911, for example).

In the configuration with parking cams provided in the drum brakes in the rear-wheels, if the drum brakes are replaced by disk brakes, the type of parking cams is quite different from that of the former and the braking effectiveness is lower, so that the design flexibility of the braking system becomes limited, resulting in inconvenience.

The configuration disclosed in Japanese Patent Application Laid-Open Hei 11 No.303991 has many drawbacks such as being heavier and costing more since it needs to have a cam for controlling the parking actuator on one side of the transmission cam drum and hence a longer transmission cam drum and a longer gear shaft, so needing many modified parts from those of the conventional make plus a wider transmission casing.

SUMMARY OF THE INVENTION

It is therefore an object of the present invention to provide a parking lock device for a saddle riding type vehicle, which can be arranged on the power output shaft of the gear transmission, is compact and needs fewer modified parts without the necessity of enlarging the transmission casing.

In order to achieve the above object, the parking lock device for a saddle riding type vehicle of this invention is configured as follows:

In accordance with the first aspect of the present invention, a parking lock device for a saddle riding type vehicle, for use in the driving force transmission system wherein the, engine power is transmitted as it is being varied in speed from the power output shaft of the gear transmission mechanism to the axle shafts via the intermediate shaft, includes: a lock gear arranged on the same shaft as the power output shaft; and a pivot element, cantilevered so as to sway about a pivot axle parallel to the power output shaft and having an engagement projection engageable with the lock gear and a slider abutment on the opposite side, and is characterized in that the engagement projection of the pivot element is adapted to engage the lock gear.

In accordance with the second aspect of the present invention, the parking lock device for a saddle riding type vehicle having the above first feature is characterized in that the lock gear is arranged on the side opposite to the power output shaft with a gear therebetween.

In accordance with the third aspect of the present invention, the parking lock device for a saddle riding type vehicle having the above first feature, for use in the driving force transmission system wherein the engine power is transmitted as it is being varied in speed from the power output shaft of the gear transmission mechanism to the front and rear wheel shafts via the intermediate shaft, includes: a lock gear arranged on the same shaft as the power output shaft;

a pivot element, cantilevered so as to sway about a pivot axle parallel to the power output shaft and having an engagement projection engageable with the lock gear on one side of the range of the swaying movement and a slider abutment on the opposite side; and an actuator made up of a rod and slider element which are able to advance and retract along the inner wall of the transmission casing and disposed on the side opposite to the lock gear with the pivot element arranged in between, the advancing and retracting direction of movement of the actuator being approximately parallel to the swaying direction of the pivot element, and is characterized in that the movement of the slider element causes the pivot element to sway so as to bring the engagement projection into mesh with lock gear.

In accordance with the fourth aspect of the present invention, the parking lock device for a saddle riding type vehicle having the above third feature is characterized in that the actuator is comprised of a rod, an arm for causing the rod to advance and retract, a slider element which is movable relative to the rod, an urging element for urging the slider element toward the distal end of the rod and a stopper disposed at the distal end of the rod for constraining the movement of the slider element.

In accordance with the fifth aspect of the present invention, the parking lock device for a saddle riding type vehicle having the above fourth feature, further includes: a constraint element positioned partway within the movable range of the slider element and fixed to the transmission casing wall and is characterized in that the constraint element constraining the advancing and retracting movement of the slider element by abutment against the tapered surface at the distal end of the slider element and causing the actuator to sway in the direction approximately perpendicular to the advancing and retracting direction of the slider element when the rod is moved further than a predetermined distance and swaying of the actuator releases the constraint on the advancing and retracting movement of the slider element and the slider element comes into sliding contact with the slider abutment of the pivot element so as to sway the pivot element.

In accordance with the sixth aspect of the present invention, the parking lock device for a saddle riding type vehicle having the above third feature is characterized in that the pivot element is provided with a release urging element for urging the pivot element in the direction such that the pivot element will come away from the lock gear while the urging element for the slider element provides an elastic force which can urge the projection of the pivot element in the direction such that the projection will come into mesh with the lock gear.

In accordance with the seventh aspect of the present invention, the parking lock device for a saddle riding type vehicle having the above fourth feature is characterized in that the pivot element is provided with a release urging element for urging the pivot element in the direction such that the pivot element will come away from the lock gear while the urging element for the slider element provides an elastic force which can urge the projection of the pivot element in the direction such that the projection will come into mesh with the lock gear.

In accordance with the eighth aspect of the present invention, the parking lock device for a saddle riding type vehicle having the above fifth feature is characterized in that the pivot element is provided with a release urging element for urging the pivot element in the direction such that the pivot element will come away from the lock gear while the urging element for the slider element provides an elastic force which can urge the projection of the pivot element in the direction such that the projection will come into mesh with the lock gear.

According to the present invention, since the engagement projection of the pivot element is adapted to mesh the lock gear provided on the power output shaft of the gear transmission so as to restrain and lock the power output shaft, it is possible to achieve the function of a parking lock device for preventing the vehicle from moving. Further, since the actuator is arranged on the side opposite to the lock gear with respect to the pivot element so that the pivot element will come into mesh with the lock gear by moving the actuator back and forth, it is possible to provide the pivot element in the form of a cantilever. This configuration contributes to making the parking lock device compact. Further, since the movement of the actuator is set to be approximately perpendicular to the swaying direction of the pivot element, this arrangement makes the layout space of the actuator compact.

According to the present invention, since the slider element is configured so as to be movable relative to the rod and since the advancing and retracting movement of the rod is transmitted to the slider element by the urging element, it is possible to provide a waiting structure with a simple configuration.

Illustratively, even if engagement projection of the pivot element has not yet engaged with the lock gear, a small amount of turn of the lock gear is able to cause the slider element being urged by the urging element to move and sway the pivot element so as to positively make the engagement projection fit into the indentation between teeth of the lock gear.

According to the present invention, as the actuator advances or retracts, the slider element sways in the direction approximately perpendicular to the movement by the function of constraint element so as to cause the engagement projection to mesh the lock gear. Therefore, the urging force along the advancing and retracting direction can be efficiently converted into that along the swaying direction.

According to the present invention, if engagement projection of the pivot element and the lock gear are not properly in mesh, it is possible to positively make the engagement projection mesh the lock gear when the lock gear turns a small amount.

DESCRIPTION OF THE PREFERRED EMBODIMENTS

The embodiment of the present invention will hereinafter be described with reference to FIGS. 1 through 7.

Figure 7:
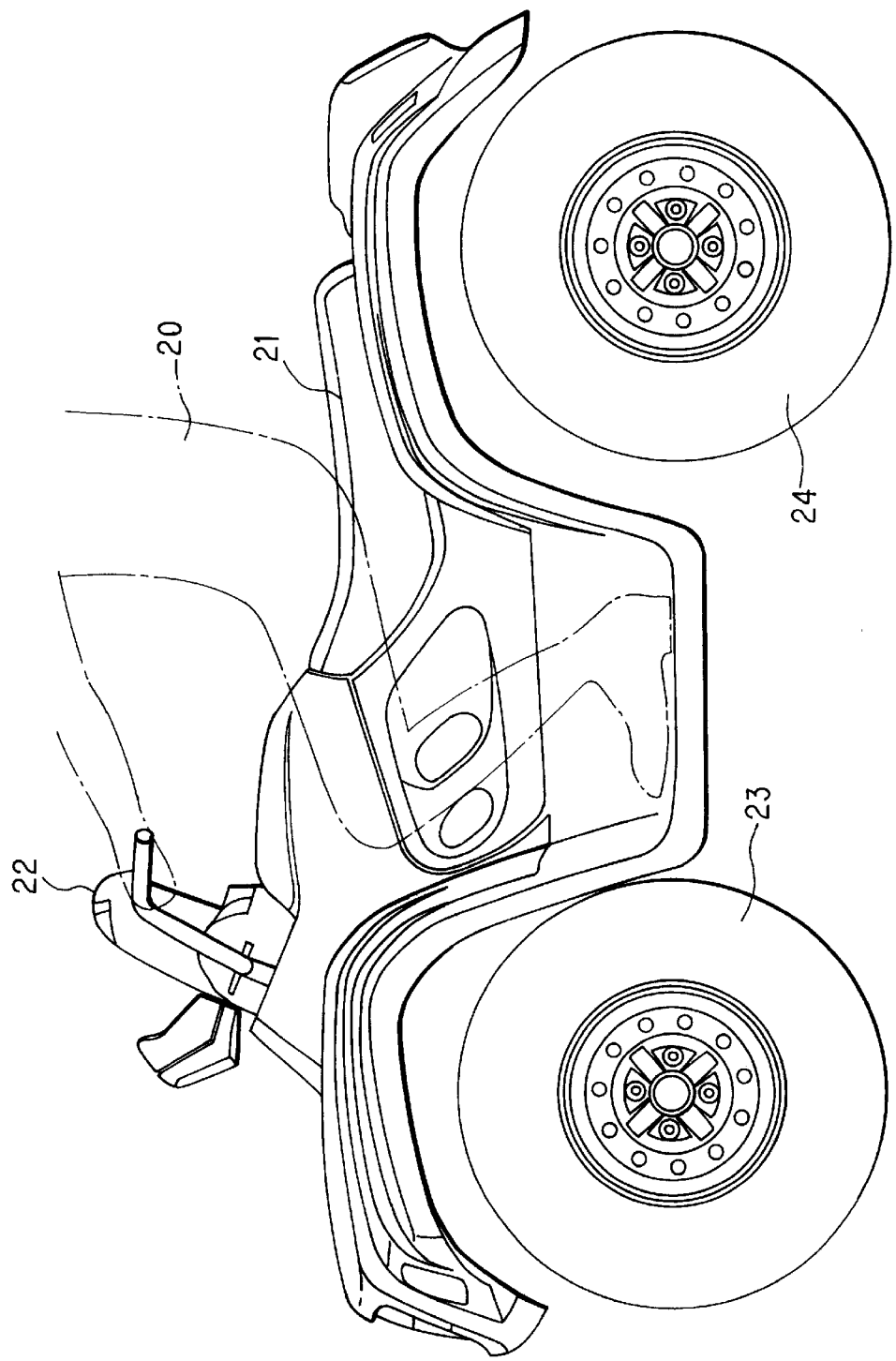
FIG. 7 is an overall side view showing a saddle riding type vehicle in accordance with the embodiment of the present invention.

The embodiment is a parking lock device mounted on a saddle riding type vehicle called as buggy, i.e., four-wheel drive vehicle which drives front and rear wheels 23 and 24 and hence suitable for rough terrain and is maneuvered by a rider 20 straddling a saddle type seat 21 thereof by gripping its handlebars 22, as shown in FIG. 7. The engine unit is mounted on the body under seal 21.

Figure 5:
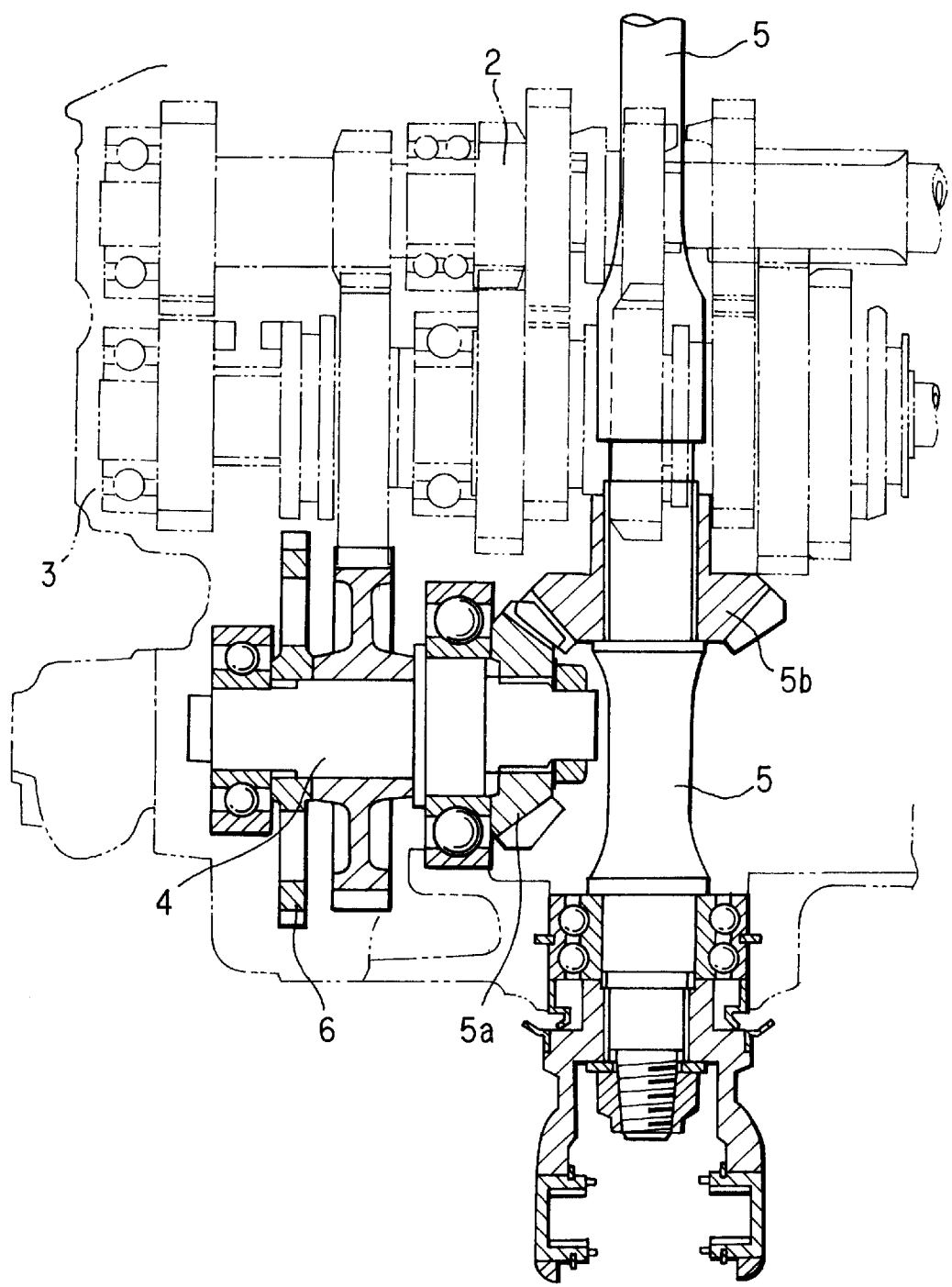
FIG. 5 is a transverse cross sectional view of the power output shaft portion of the gear transmission of the vehicle engine unit in accordance with the embodiment of the present invention.
Figure 6:
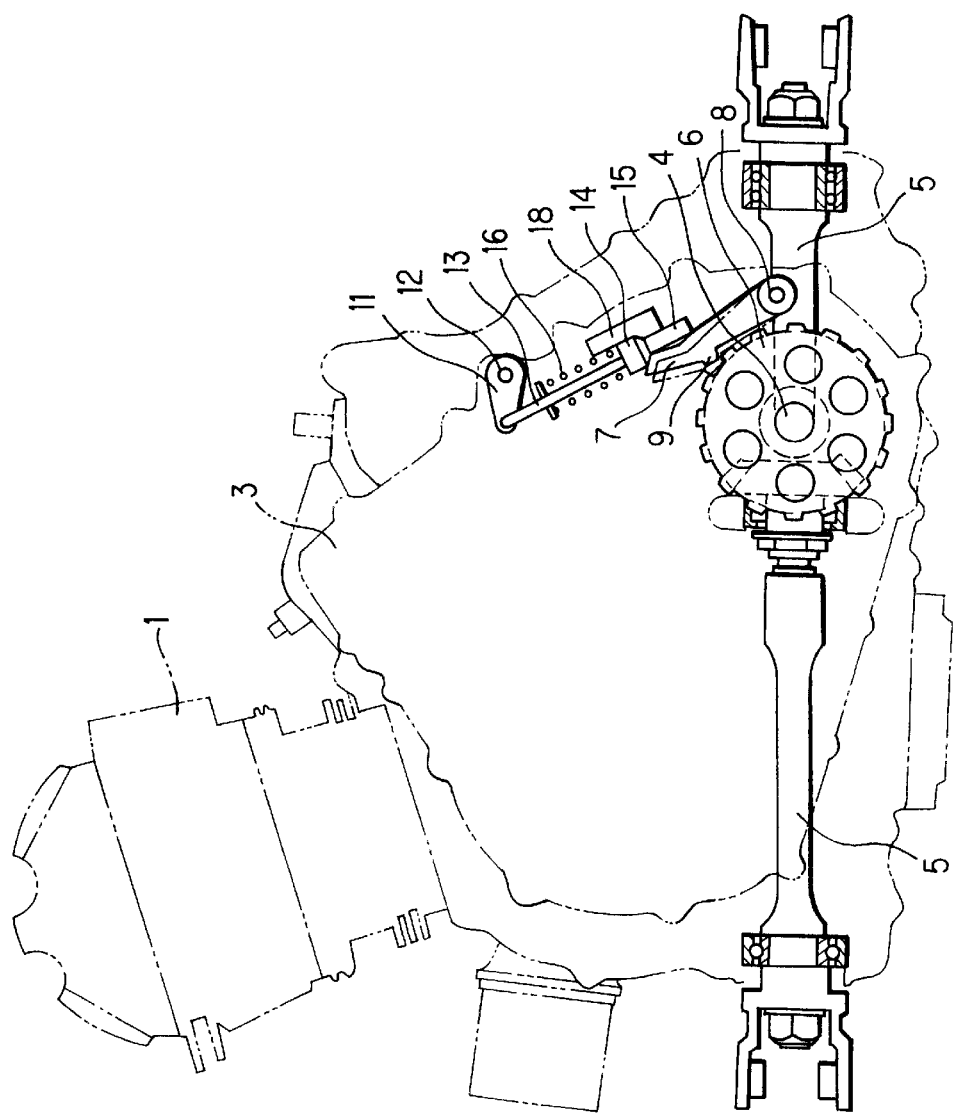
FIG. 6 is a view for illustrating the layout of a parking lock mechanism in the engine unit.

In this engine unit, as shown in FIGS. 5 and 6, a gear transmission 2 is coupled on the rear side of an engine 1 so that the casing (engine case) 3 of gear transmission 2 and engine 1 are integrally formed. The power output shaft, designated at 4, of gear transmission 2, is coupled to an intermediate shaft 5 through bevel gears 5a and 5b. This intermediate shaft 5 is coupled to the front and rear left and right axle shafts to drive the wheels. A lock gear 6 is arranged on the same shaft as power output shaft 4 so that it is fixed with respect to the rotational direction of the shaft.

Figure 1:
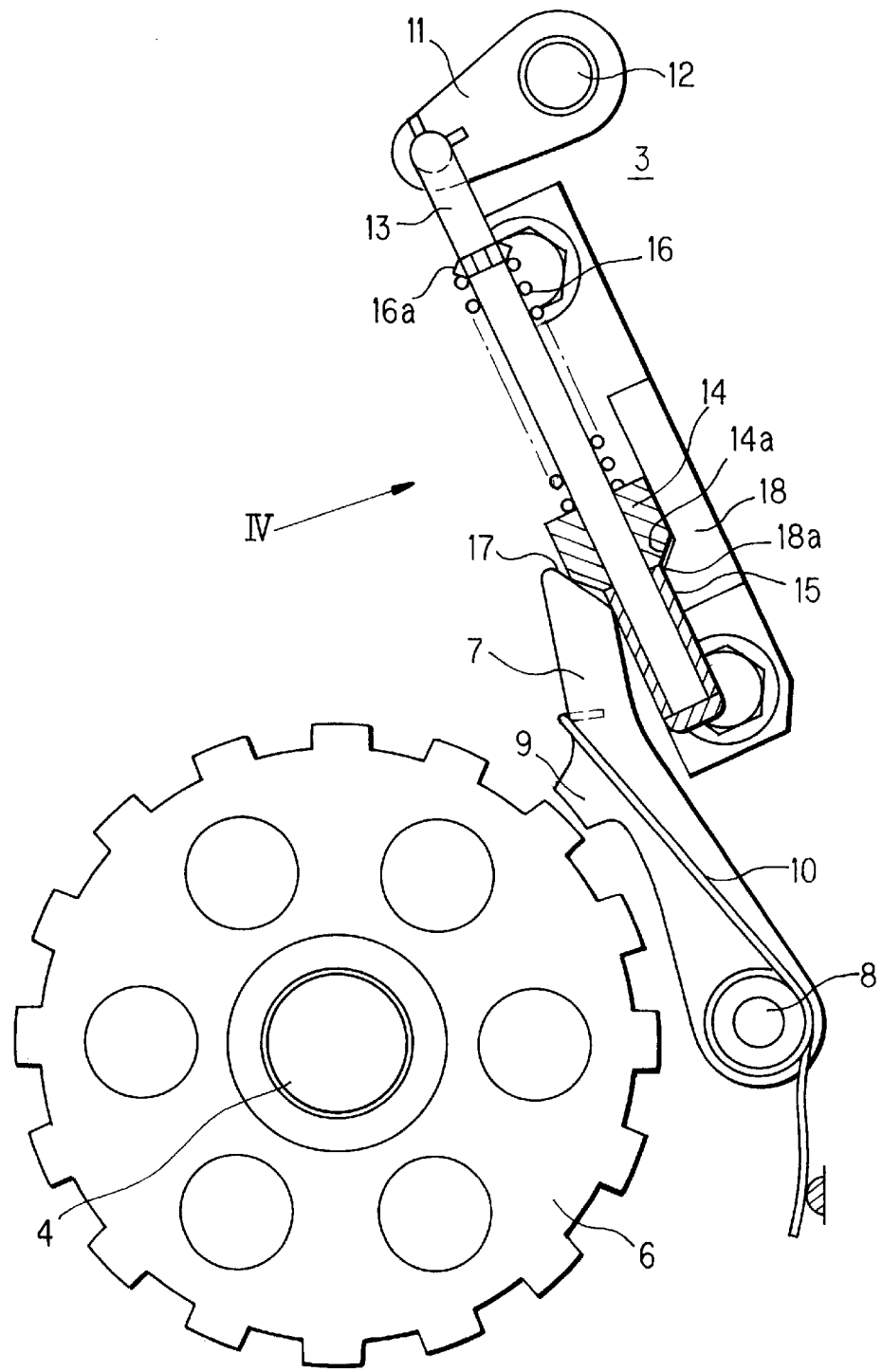
FIG. 1 is a partial vertical side sectional view showing a parking lock device according to the present invention when the locking mechanism is freed.
Figure 2:
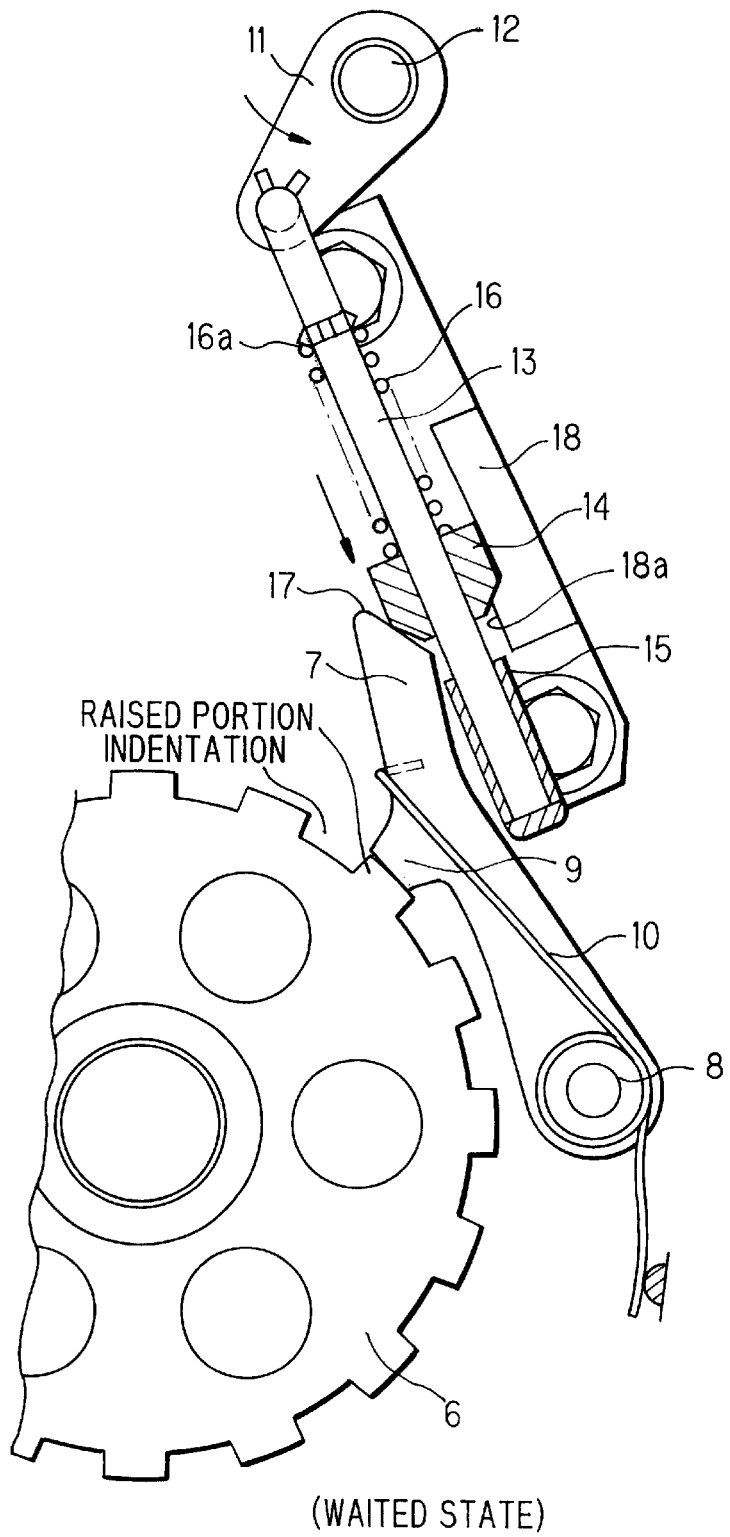
FIG. 2 is a partial vertical side sectional view showing the same parking lock device when the locking mechanism is waiting to be locked.
Figure 3:
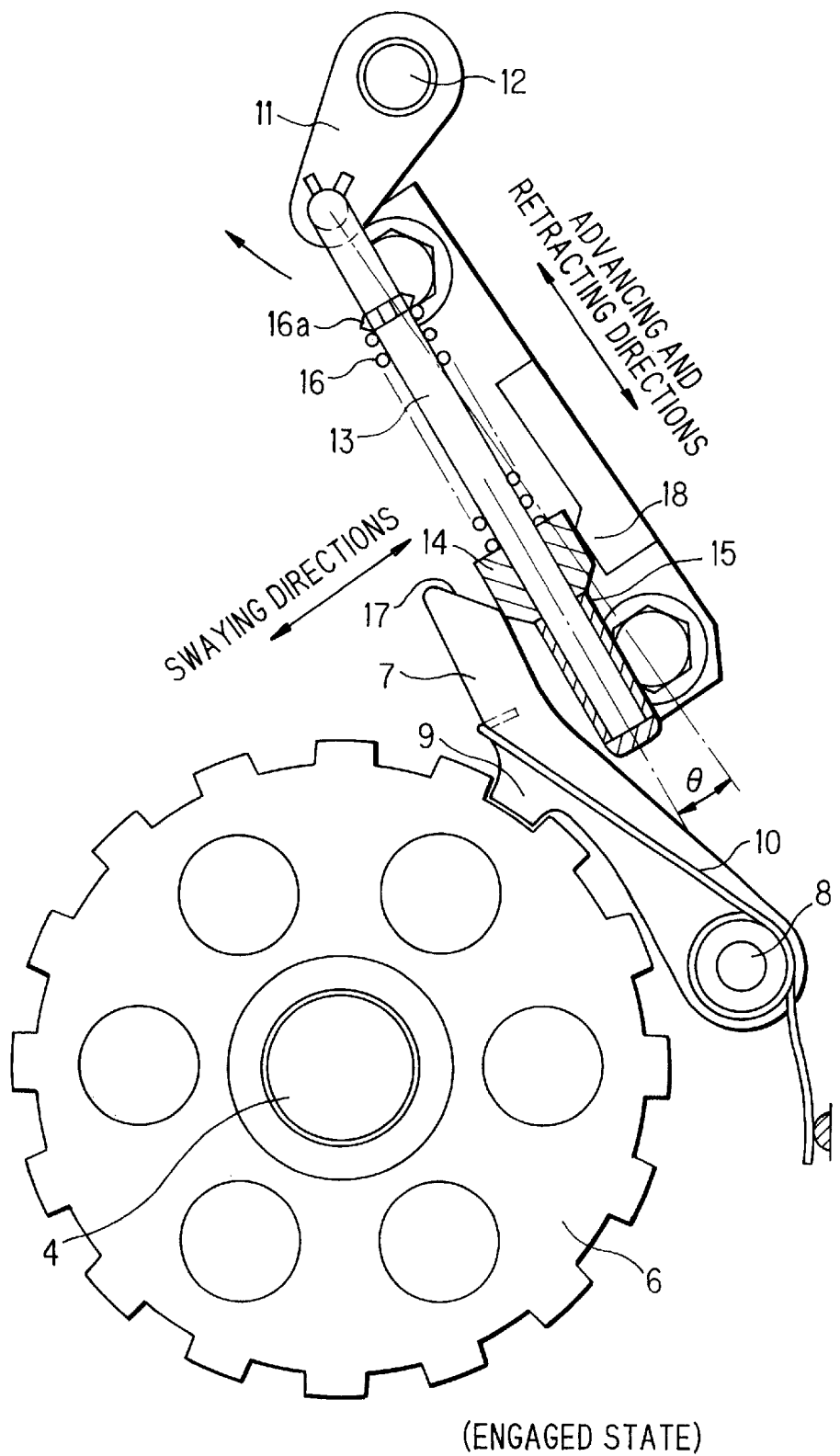
FIG. 3 is a partial vertical side sectional view showing the same parking lock device when the locking mechanism is being locked.
Figure 4:
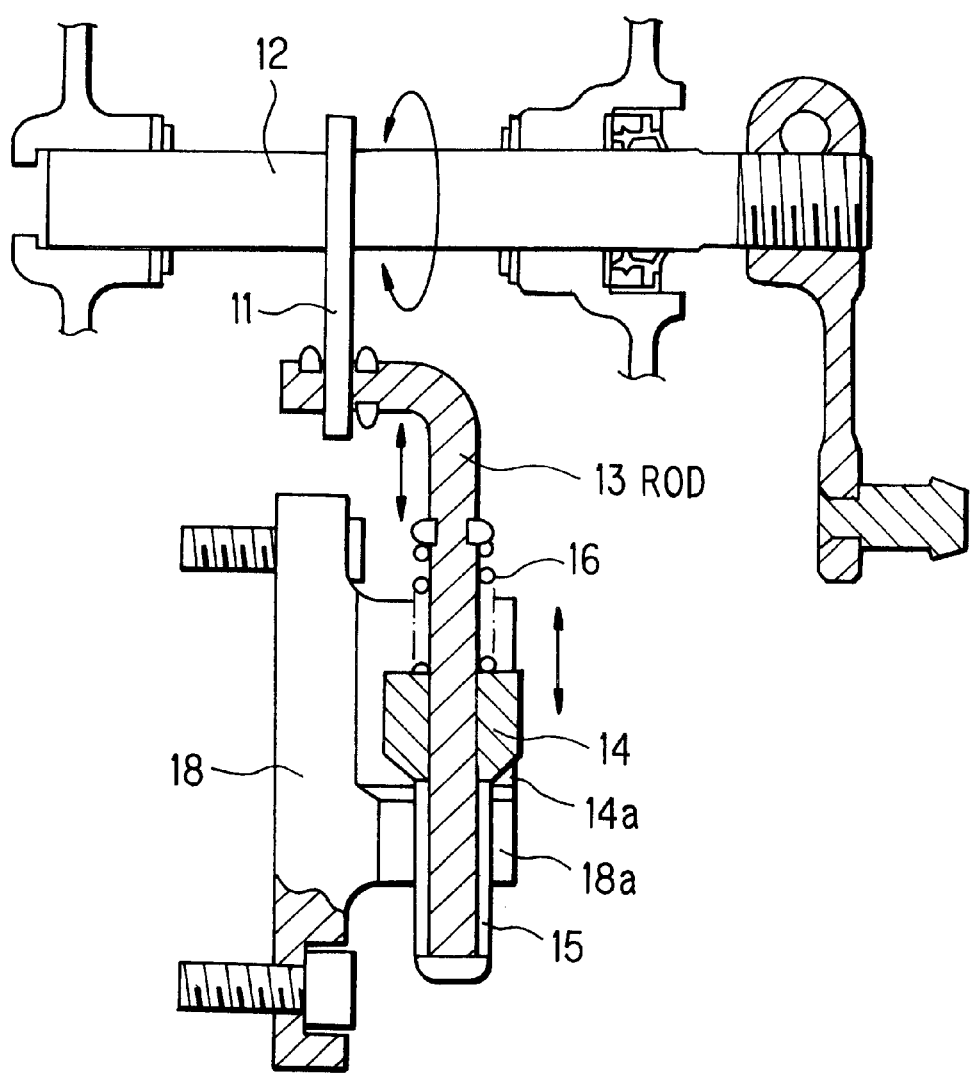
FIG. 4 is a detailed view of the parking lock device, viewed from a point in the IV direction in FIG. 1.

As shown in FIGS. 1 to 3, an engagement piece(pivot element) 7 is arranged on the radially outer side of lock gear 6. This engagement piece 7 is pivoted at its lower end on an axle(pivot shaft) 8 which is in parallel with the power output shaft 4 and fixed to casing 3 so that the engagement piece is cantilevered and pivots on axle 8. This engagement piece 7 has a claw(engagement projection) 9 engageable with lock gear 6 on one side within the pivoting range and an upper inclined portion(slider abutment) 17 on the other side. That is, rotation of engagement piece 7 makes claw 9 come in and out of mesh with lock gear 6. Further, a release spring 10 is provided to urge engagement piece 7 in the direction such that claw 9 will come away from lock gear 6.

Provided on the upper side of engagement piece 7 is a manipulator arm 11, which is pivoted on an axle 12 and is adapted to turn about axle 12 by an unillustrated manual lever or the like. A rod 13 which can advance and retract along the inner wall of casing 3 in link with manipulator arm 11 is slidably inserted into a slider piece(slider element) 14.

An actuator made up of rod 13, slider piece 14 and others is arranged on the side opposite to lock gear 6 over engagement piece 7 so that engagement piece 7 will move or sway approximately perpendicularly to the movement of rod 13. As engagement piece 7 sways resulting from the advancing and retracting movement of slider piece 14, claw 9 will become engaged with lock gear 6.

More specifically, the actuator is comprised of rod 13, manipulator arm 11 that moves the rod 13 back and forth, slider piece 14 movable relative to rod 13, a coil spring 16 that urges slider piece 14 toward the distal end of rod 13, and a spacer(stopper) 15 arranged at the distal side of rod 13 for limiting the movement of slider piece 14. This spacer 15 is a cylinder having one end open and is fixed so as to cover the distal end of rod 13. The lower end of slider piece 14 which guides rod 13 is arranged so as to abut spacer 15. Coil spring 16 is fitted over slider piece 14 with its top ring 16*a* engaged with rod 13 and its lower end abutted against slider piece 14 so as to urge slider piece 14 against spacer 15. Slider piece 14 has a tapered surface 14*a* formed so as to become narrower toward the lower end.

A guide cam(constraint element) 18 is positioned partway within the movable range of slider piece 14 and fixed by bolt fastening to the inner wall of casing 3. This guide cam 18 has a stepped surface 18*a* which is raised at the lower part thereof opposing the rod and closer to rod 13 than the upper part. That is, tapered surface 14*a* at the distal side of slider piece 14 abuts this stepped surface 18*a* to constrain the advancing and retracting movement of slider piece 14 and sways rod 13 by an angle θ in the direction approximately perpendicular to the direction of the advancing and retracting movement of slider piece 14 when rod 13 is moved further forward(downward) than a predetermined distance. In this way, sway of rod 13 releases the constraint on the movement of slider piece 14 so that the slider piece 14 abuts and slides along the upper inclined portion(slider abutment) 17 of engagement piece 7 to sway the engagement piece.

Here, for engagement piece 7, release spring(release urging element) 10 is provided to urge engagement piece 7 in the direction such that it comes away from lock gear 6 while the aforementioned coil spring 16 provides elastic force to urge the engagement piece in such a direction that its claw 9 will come into mesh with lock gear 6 when slider piece 14 abuts the engagement piece.

Now, the operation of the embodiment will be described. First, as rod 13 is pulled up by manipulator arm 11, slider piece 14, whilst it is being urged by the elastic force of coil spring 16, abut spacer 15 and is moved up by spacer 15, as shown in FIG. 1. Then, slider piece 14 moves away from the inclined portion(slider abutment) 17, so that engagement piece 7 sways in a direction such that it comes away from lock gear 6 by the elastic force of release spring 10. This makes claw 9 disengage from engagement piece 7, thus power output shaft 4 becomes free to turn.

When rod 13 is moved down by manipulator arm 11, slider piece 14 also moves down by means of coil spring 16. However, as shown in FIG. 2, claw 9 of engagement piece 7 abuts one raised portion of lock gear 6, the slider piece 14 stops, being unable to advance any further and being held off (in the waiting state).

Then, as lock gear 6 turns a small amount so that the next trough (indented portion between gear teeth) of lock gear 6 meets claw 9 as shown in FIG. 3, the elastic force of coil spring 16 causes slider piece 14 to slide along guide cam 18 until the slider abuts spacer 15 and fix engagement piece 7 at a position where its claw 9 is in mesh with lock gear 6, whereby power output shaft 4 is fixed so as not to turn and the wheel shaft is locked.

In this way, the rotating operation of manipulator arm 11 moves engagement piece 7 in and out of mesh with lock gear.6, thus making it possible to make parking lock active and. also release the lock.

According to the parking lock device of the embodiment, the turning of power output shaft 4 is constrained and stopped by engaging or meshing claw 9 of the engagement piece with locking gear 6 provided on power output shaft 4 of gear transmission 2, whereby it is possible to achieve the function of a parking lock device for locking the movement of the vehicle. Since rod 13 and slider piece 14 are arranged on the side opposite to lock gear 6 with respect to engagement piece 7 so that the engagement piece 7 can be engaged with and disengaged from lock gear 6 by moving the rod 13 back and forth, it is possible to provide engagement piece 7 in the form of a cantilever. This configuration contributes to making the parking lock device compact. Further, since the advancing and retracting movement of rod 13 and slider piece 14 is set to be approximately perpendicular to the swaying direction of engagement piece 7, this arrangement makes the layout space of rod 13 and other parts compact.

Since slider piece 14 is configured so as to be movable relative to rod 13 and since the advancing and retracting movement of rod 13 is transmitted to slider piece 14 by coil spring 16, it is possible to provide a waiting structure with a simple configuration.

Illustratively, even if claw 9 of the engagement piece has not yet engaged with lock gear 6, a small amount of turn of lock gear 6 is able to cause slider piece 14 being urged by coil spring 16 to move and sway engagement piece 7 so as to positively make claw 9 fit into the indentation between teeth of lock gear 6.

As rod 13 and slider piece 14 advance or retract, slider piece 14 sways in the direction approximately perpendicular to the movement by the function of guide cam 18 so as to cause claw 9 to mesh lock gear 6. Therefore, the urging force along the advancing and retracting direction can be efficiently converted into that along the swaying direction.

If claw 9 of engagement piece 7 and lock gear 6 are not properly in mesh, it is possible to positively make claw 9 mesh lock gear 6 when the lock gear turns a small amount.

Further, since engagement piece 7, manipulator arm 11 and other parts can be laid out above lock gear 6 within the space behind casing 3, it is possible to arrange them compactly without the necessity of enlarging casing 3. Moreover, since the manipulator arm can be arranged close to an unillustrated manual lever which should be arranged within reach of a rider 20, it is possible to shorten the cable and other parts laid out between them.

When engagement piece 7 is made to mesh lock gear 6, if engagement piece 7 abuts the raised portion of lock gear 6, it is held off by abutment of the raised portion, then engagement piece 7 comes in mesh with lock gear 6 by the function of coil spring 16 and establish lock when next indentation of lock gear 6 meets engagement piece 7. When manipulator arm 11 is pulled up to release engagement of engagement piece 7, engagement piece 7 comes away from lock gear 6 by the function of elasticity of release spring 10, thus assuring release of lock gear 6.

As has been described heretofore, according to the present invention thus configured, since the engagement projection of the pivot element is adapted to mesh the lock gear provided on the power output shaft of the gear transmission. so as to restrain and lock the power output shaft, it is possible to achieve the function of a parking lock device for preventing the vehicle from moving. Further, since the actuator is arranged on the side opposite to the lock gear with respect to the pivot element so that the pivot element will come into mesh with the lock gear by moving the actuator back and forth, it is possible to provide the pivot element in the form of a cantilever. This configuration contributes to making the parking lock device compact. Further, since the movement of the actuator is set to be approximately perpendicular to the swaying direction of the pivot element, this arrangement makes the layout space of the actuator compact.

It is possible to lay out the pivot element, actuator arm and other necessary parts within the casing space above the lock gear without the necessity of enlarging the casing width, hence this arrangement makes it possible to provide a compact and inexpensive parking lock mechanism without affecting the overall configuration. For locking, the slider element of the actuator will be held off until the engagement projection meets the indentation of the lock gear. For releasing the lock, the pivot element positively comes away from the lock gear by the urging force of the release urging element.

What is claimed is:

1. A parking lock device for a saddle riding type vehicle, for use in a driving force transmission system wherein engine power is transmitted as it is being varied in speed from a power output shaft of a gear transmission mechanism to axle shafts via an intermediate shaft, comprising:
    a lock gear arranged on the same shaft as the power output shaft;
    a pivot element, cantilevered so as to sway about a pivot axle parallel to the power output shaft and having an engagement projection engageable with the lock gear and a slider abutment on the opposite side;
    an actuator including a rod and a slider element which are able to advance and retract along a surface and are disposed on a side opposite to the lock gear with the pivot element therebetween; and
    a constraint element that includes a first tapered surface for abutment against a complementary second tapered surface that is formed at a distal end of the slider element for constraining the advancing and retracting movement of the slider element, wherein once the first and second tapered surfaces abut one another and the slider element is further moved, the slider element causes the pivot element to sway so as to bring the engagement projection into mesh with the lock gear.

2. The parking lock device for a saddle riding type vehicle according to claim 1, wherein the lock gear is arranged on the side opposite to the power output shaft with a gear therebetween.

3. The parking lock device for a saddle riding type vehicle according to claim 1, for use in the driving force transmission system wherein the engine power is transmitted as it is being varied in speed from the power output shaft of the gear transmission mechanism to the front and rear wheel shafts via the intermediate shaft, comprising:
    a lock gear arranged on the same shaft as the power output shaft;
    a pivot element, cantilevered so as to sway about a pivot axle parallel to the power output shaft and having an engagement projection engageable with the lock gear on one side of, the range of the swaying movement and a slider abutment on the opposite side; and
    wherein the advancing and retracting direction of movement of the actuator is approximately perpendicular to the swaying direction of the pivot element.

4. The parking lock device for a saddle riding type vehicle according to claim 3, wherein the actuator is comprised of a rod, an arm for causing the rod to advance and retract, a slider element which is movable relative to the rod, an urging element for urging the slider element toward the distal end of the rod and a stopper disposed at the distal end of the rod for constraining the movement of the slider element.

5. The parking lock device for a saddle riding type vehicle according to claim 4, wherein the constraint element is positioned partway within the movable range of the slider element and fixed to the transmission casing wall, wherein the constraining action of the constraint element causes the actuator to sway in a direction approximately perpendicular to the advancing and retracting direction of the slider element when the rod is moved further than a predetermined distance and swaying of the actuator releases the constraint on the advancing and retracting movement of the slider element and the slider element comes into sliding contact with the slider abutment of the pivot element so as to sway the pivot element.

6. The parking lock device for a saddle riding type vehicle according to claim 3, wherein the pivot element is provided with a release urging element for urging the pivot element in the direction such that the pivot element will come away from the lock gear while the urging element for the slider element provides an elastic force which can urge the projection of the pivot element in the direction such that the projection will come into mesh with the lock gear.

7. The parking lock device for a saddle riding type vehicle according to claim 4, wherein the pivot element is provided with a release urging element for urging the pivot element in the direction such that the pivot element will come away from the lock gear while the urging element for the slider element provides an elastic force which can urge the projection of the pivot element in the direction such that the projection will come into mesh with the lock gear.

8. The parking lock device for a saddle riding type vehicle according to claim 5, wherein the pivot element is provided with a release urging element for urging the pivot element in the direction such that the pivot element will come away from the lock gear while the urging element for the slider element provides an elastic force which can urge the projection of the pivot element in the direction such that the projection will come into mesh with the lock gear.

9. The parking lock device for a saddle riding type vehicle according to claim 1, wherein the constraint element causes the actuator to sway in a direction approximately perpendicular to the advancing and retracting direction of the slider element when the first and second tapered surfaces abut and the actuator is moved further.

10. The parking lock device for a saddle riding type vehicle according to claim 1, wherein the actuator includes a stopper disposed at a distal end of the rod and being a separate member therefrom for constraining the movement of the slider element along the rod.

* * * * *